United States Patent
Evans et al.

(10) Patent No.: US 8,825,552 B2
(45) Date of Patent: Sep. 2, 2014

(54) PROVIDING A RADIO STATION AT A USER DEVICE USING PREVIOUSLY OBTAINED DRM LOCKED CONTENT

(75) Inventors: Gregory M. Evans, Raleigh, NC (US); Kunal Kandekar, Morrisville, NC (US); Alfredo C. Issa, Apex, NC (US)

(73) Assignee: Lemi Technology, LLC, Wilmington, DE (US)

( * ) Notice: Subject to any disclaimer, the term of this patent is extended or adjusted under 35 U.S.C. 154(b) by 1242 days.

(21) Appl. No.: 12/239,860

(22) Filed: Sep. 29, 2008

(65) Prior Publication Data
US 2010/0082488 A1 Apr. 1, 2010

(51) Int. Cl.
*G06Q 99/00* (2006.01)
*G06Q 30/06* (2012.01)

(52) U.S. Cl.
CPC ........ *G06Q 30/0631* (2013.01); *G06Q 2220/18* (2013.01); *G06Q 2220/10* (2013.01)
USPC .............................................. 705/59; 705/51

(58) Field of Classification Search
USPC .................................................... 705/51, 59
See application file for complete search history.

(56) References Cited

U.S. PATENT DOCUMENTS

| | | | |
|---|---|---|---|
| 6,349,339 | B1 | 2/2002 | Williams |
| 6,374,177 | B1 | 4/2002 | Lee et al. |
| 6,985,694 | B1 | 1/2006 | De Bonet et al. |
| 8,005,419 | B2 * | 8/2011 | Patsiokas et al. ............ 455/3.02 |
| 8,510,847 | B2 * | 8/2013 | Knight et al. .................... 726/26 |
| 2004/0039796 | A1 | 2/2004 | Watkins |
| 2004/0128198 | A1 | 7/2004 | Register et al. |
| 2007/0113081 | A1 | 5/2007 | Camp |
| 2007/0286169 | A1 | 12/2007 | Roman |
| 2008/0031475 | A1 | 2/2008 | Goldstein |
| 2008/0052150 | A1 | 2/2008 | Grouf et al. |
| 2008/0162358 | A1 * | 7/2008 | Patsiokas et al. ................ 705/57 |
| 2009/0061764 | A1 * | 3/2009 | Lockhart et al. ............. 455/3.06 |
| 2010/0031366 | A1 * | 2/2010 | Knight et al. .................... 726/26 |

OTHER PUBLICATIONS

"Digital rights management—Wikipedia, the free encyclopedia," http://ermikipedia.org/wiki/Digital_rights_management, printed Aug. 13, 2009, 22 pages.
"Playlist—Wikipedia, the free encyclopedia," http://en.wikipedia.org/wiki/Playlist, printed Aug. 13, 2009, 2 pages.

(Continued)

*Primary Examiner* — James D Nigh

(57) ABSTRACT

A system and method are disclosed for providing a radio station for playback at a user device using previously obtained Digital Rights Management (DRM) locked content for the radio station. In one embodiment, a radio station application and DRM locked content to be used by the radio station application are downloaded to a user device, which is preferably a mobile user device. The DRM locked content includes a number of DRM locked songs that may be used for the radio station. Thereafter, the radio station application obtains a playlist for the radio station, where the playlist for the radio station includes at least a subset of the DRM locked content provided to the user device for the radio station. Playback of the playlist for the radio station is then provided at the user device, and playback is reported to a remote service for royalty tracking.

38 Claims, 6 Drawing Sheets

(56) References Cited

OTHER PUBLICATIONS

"Music scheduling system—Wikipedia, the free encyclopedia," http://en.wikipedia.org/wiki/Music_scheduling_system, printed Aug. 13, 2009, 2 pages.

"Apple—iPod touch—Features," http://www.apple.com/ipodtouch/features/, printed Aug. 13, 2009, 2 pages.

"Apple—iPhone—View all the features of the new iPhone 3GS," http://www.apple.com/iphone/iphone-3gs/, printed Aug. 11, 2009, 5 pages.

"Rhapsody Unlimited," http://learn.rhapsody.com/plans/unlimited?src=rcom_acctcrt_uld&pcode=rn, copyright 2001-2008 Listen.com, printed Aug. 13, 2009, 1 page.

* cited by examiner

PROVIDING A RADIO STATION AT A USER DEVICE USING PREVIOUSLY OBTAINED DRM LOCKED CONTENT

FIELD OF THE INVENTION

The present invention relates to providing a radio station for playback at a user device using previously obtained Digital Rights Management (DRM) locked content for the radio station.

BACKGROUND OF THE INVENTION

Typical streaming Internet Protocol (IP) radio stations, including customized or personalized streaming IP radio stations, require a substantial amount of bandwidth for streaming the radio content to user devices of users desiring to listen to those streaming IP radio stations. This is particularly an issue with mobile user devices, such as smart phones, which typically have bandwidth capabilities that are substantially less than non-mobile user devices. In addition, users of mobile user devices may incur additional costs for data connections. As such, there is a need for a system and method that reduces bandwidth requirements for providing such radio stations to user devices.

SUMMARY OF THE INVENTION

The present invention relates to providing a radio station for playback at a user device using previously obtained Digital Rights Management (DRM) locked content for the radio station. In one embodiment, a radio station application and DRM locked content to be used by the radio station application to provide a corresponding radio station are downloaded to a user device, which is preferably a mobile user device. The DRM locked content includes a number of DRM locked songs that may be used for the radio station. Thereafter, at the user device, the radio station application obtains a playlist for the radio station, where the playlist for the radio station includes at least a subset of the DRM locked content provided to the user device for the radio station. Further, in one embodiment, the playlist for the radio station is customized for the user of the user device. Playback of the playlist for the radio station is then provided at the user device, and the playback is reported to a remote service for royalty tracking.

In one embodiment, the radio station application obtains the playlist for the radio station from a remote radio station service. The remote radio station service may generate the playlist for the radio station based on one or more rules for the radio station. In addition, the playlist for the radio station generated by the remote radio station service may be customized for the user of the user device. In another embodiment, the radio station application obtains the playlist for the radio station by generating the playlist for the radio station at the user device based upon a playlist strategy for the radio station. The playlist strategy for the radio station may be obtained from a remote radio station service. In addition, the playlist strategy for the radio station may be customized for the user of the user device.

Further, in one embodiment, in addition to including at least some of the DRM locked content previously downloaded to the user device, the playlist for the radio station may include one or more songs owned by the user of the user device and stored by the user device, one or more songs accessible to the user device from an associated Local Area Network (LAN) media server, supplemental content such as supplemental songs that are to be obtained from one or more remote content sources, or any combination thereof. Still further, in another embodiment, audio advertisements may also be included in the playlist for the radio station. The audio advertisements may be included in the DRM locked content provided to the user device or may be supplemental content obtained from a remote content source. In addition or alternatively, visual advertisements may be presented on a display of the user device simultaneously with playback of the playlist for the radio station. The visual advertisements may be included in the DRM locked content provided to the user device or obtained from a remote content source.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
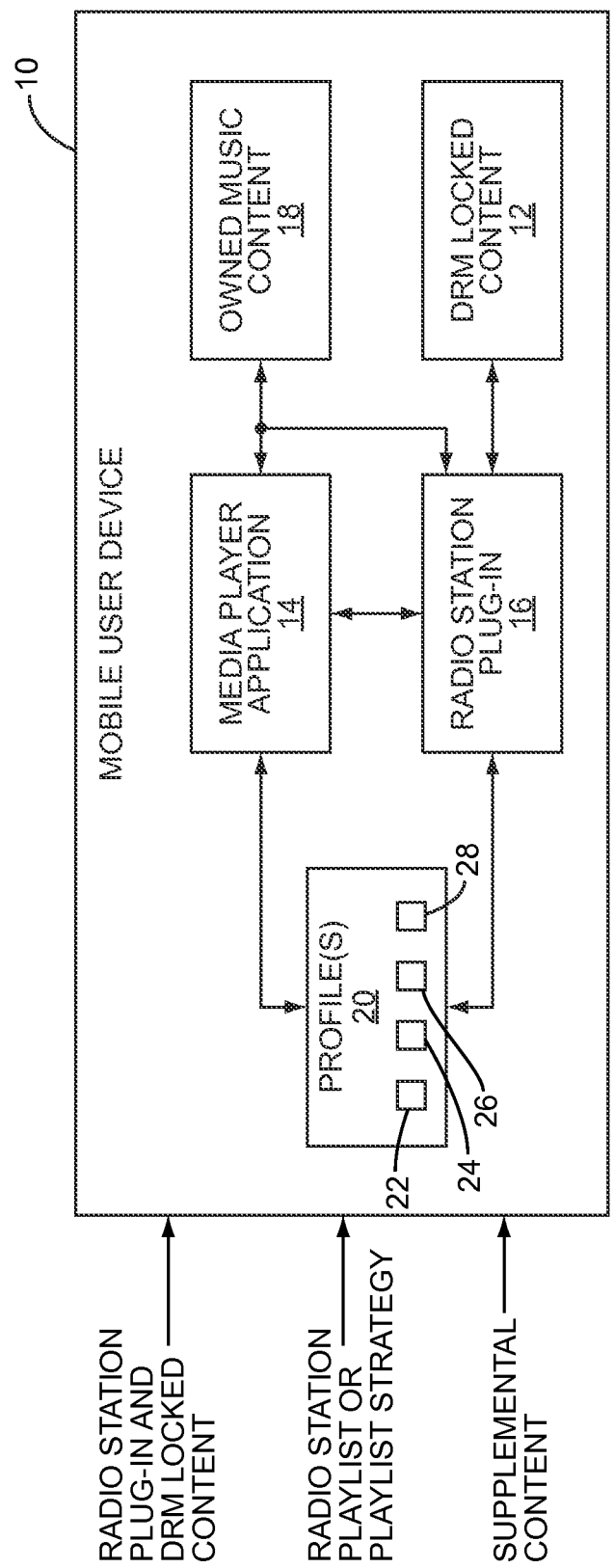
FIG. 1 is a functional block diagram of a mobile user device that provides a radio station for playback using Digital Rights Management (DRM) locked content previously provided to the mobile user device for the radio station according to one embodiment of the present invention.

FIG. 1 illustrates a mobile user device 10 that provides a radio station for playback to an associated user using Digital Rights Management (DRM) locked content 12 previously provided to the mobile user device 10 for the radio station according to one embodiment of the present invention. The mobile user device 10 may be, for example, a mobile smart phone such as an Apple iPhone, a portable media player having network capabilities such as an Apple iPod Touch®, or the like. In this embodiment, the mobile user device 10 includes a media player application 14 and a radio station application 16. As shown, the media player application 14 is a software application and the radio station application 16 is a radio station plug-in 16, which is also implemented in software. Note that the radio station application 16 is more specifically referred to as a radio station plug-in 16 for much of the discussion herein in light of the particular embodiment illustrated in FIG. 1. In an alternative embodiment, the media player application 14 and the radio station plug-in 16 may be implemented as one combined radio station application. Further, while the media player application 14 and the radio station application 16 are discussed herein as being implemented in software, the present invention is not limited thereto. The media player application 14 and the radio station application 16 may be implemented in software, hardware, or a combination thereof.

In addition, the mobile user device 10 stores owned music content 18 and the DRM locked content 12. The owned music content 18 may also be referred to herein as an owned or local music collection. The owned music content 18 includes a number of songs owned by a user of the mobile user device 10. As used herein, a song is owned by the user if the user has purchased the song or otherwise acquired access rights to the song by, for example, payment of a subscription fee to a subscription-based service such as Rhapsody Unlimited. The DRM locked content 12 includes a number of DRM locked songs to be used only by the radio station plug-in 16 to provide a radio station, as discussed below. In addition, the DRM locked content 12 may include audio advertisements that may be used in the radio station, visual advertisements that may be displayed by the mobile user device 10 during playback of the radio station, or both.

The mobile user device 10 also stores one or more profiles 20. In general, the one or more profiles 20 are used in the generation of a playlist for the radio station. In this embodiment, the one or more profiles 20 include a local user profile 22 of the user of the mobile user device 10, a user content profile 24 of the user of the mobile user device 10, a recently played profile 26 of the user of the mobile user device 10, and a vendor maintained profile 28 of the user of the mobile user device 10. The local user profile 22 may include preferences of the user of the mobile user device 10 such as information identifying one or more preferred music genres, one or more preferred music artists, one or more preferred time periods such as one or more preferred decades, or the like. In addition, the local user profile 22 of the user of the mobile user device 10 may include presence data. The presence data may include a current geographic location at which the mobile user device 10, and thus the user, is located. Note that the location of the mobile user device 10 may be determined using any location determination means such as, for example, a Global Positioning System (GPS) receiver implemented within or associated with the mobile user device 10, mobile base station triangulation, or the like. The presence data may additionally or alternatively identify a current activity being performed by the user of the mobile user device 10. For example, the presence data may identify whether the user is exercising, relaxing, working, or the like.

The user content profile 24 of the user of the mobile user device 10 includes one or more lists or similar data structures identifying the songs in the owned music content 18 and the DRM locked songs from the DRM locked content 12. In addition, in one embodiment, the mobile user device 10 may have access to a Local Area Network based (LAN-based) media server. For instance, the mobile user device 10 may have access to songs hosted by the LAN-based media server that are owned by the user of the mobile user device 10. As such, the user content profile 24 may also include information identifying songs available to the mobile user device 10 via the LAN-based media server. For example, if the mobile user device 10 is a portable media player having a local wireless communication interface, the mobile user device 10 may have access to songs stored on a personal computer of the user when located within the home of the user via a LAN. Still further, if the DRM locked content 12 includes audio advertisements, the user content profile 24 may also include information identifying the audio advertisements included in the DRM locked content 12.

The recently played profile 26 includes information identifying songs recently played by the user of the mobile user device 10. The recently played profile 26 may be populated from or correspond to a play history maintained by the media player application 14. Lastly, the vendor maintained profile 28 may include information identifying a purchase history of the user of the mobile user device 10 with respect to a corresponding vendor and/or other vendor based knowledge of the user of the mobile user device 10. In one embodiment, the radio station provided by the radio station plug-in 16 is associated with a particular vendor. The radio station may serve as a marketing tool by which the vendor may provide advertisements to the user, draw the user into the vendor's brick-and-mortar or electronic marketplace (e.g., a physical store or a website) for the purpose of downloading the DRM locked content 12 and the radio station plug-in 16, or both.

Figure 2:
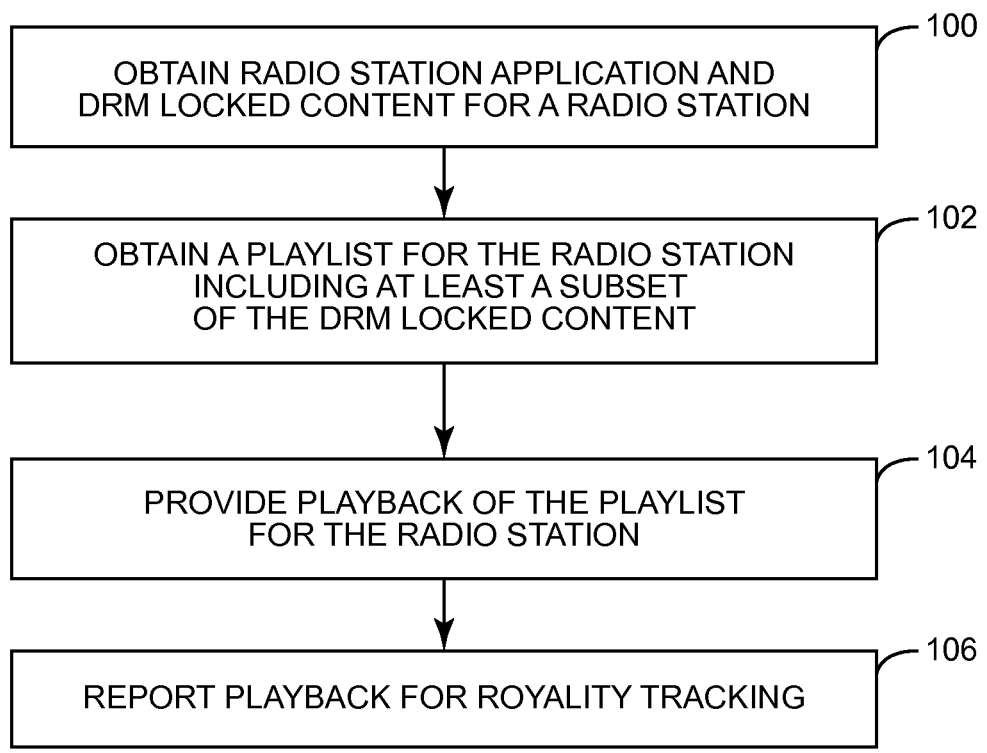
FIG. 2 is a flow chart illustrating the operation of the mobile user device of FIG. 1 according to one embodiment of the present invention.

FIG. 2 is a flow chart illustrating the operation of the mobile user device 10 of FIG. 1 according to one embodiment of the present invention. First, the mobile user device 10 obtains the radio station plug-in 16 and the DRM locked content 12 for a corresponding radio station (step 100). It should be noted that while discussion herein focuses on downloading the radio station plug-in 16, or the radio station application 16, to the mobile user device 10, the present invention is not limited thereto. In an alternative embodiment, the radio station plug-in 16, or the radio station application 16, is a native application installed or otherwise included in the mobile user device 10 at the time the mobile user device 10 is sold or otherwise provided to the user.

In one embodiment, the radio station plug-in 16 and the DRM locked content 12 are downloaded to the mobile user device 10 from a source via a wireless LAN or wireless Wide Area Network (WAN) connection such as, for example, a WiMAX (IEEE 802.16x) connection, a Long Term Evolution (LTE) or similar 3G or 4G mobile communications connection, a WiFi (802.11x) connection, or the like. In another embodiment, the radio station plug-in 16 and the DRM locked content 12 are downloaded to the mobile user device 10 from a source via a Personal Area Network (PAN) connection such as, for example, a Firewire connection, a Universal Serial Bus (USB) connection, a Bluetooth connection, an Ultra-WideBand (UWB) connection, or the like. As discussed below, in one embodiment, the source from which the radio station plug-in 16 and the DRM locked content 12 are obtained is a vendor service associated with a particular vendor. Again, the radio station may serve as a marketing tool by which the vendor may provide advertisements to the user of the mobile user device 10, draw the user into the vendor's brick-and-mortar or electronic marketplace (e.g., a physical store or a website) for the purpose of downloading the DRM locked content 12 and the radio station plug-in 16, or both.

In order to provide the radio station to the user of the mobile user device 10, the radio station plug-in 16 obtains a playlist for the radio station, where the playlist includes at least a subset of the songs from the DRM locked content 12 previously downloaded to the mobile user device 10 for use in providing the radio station (step 102). In one embodiment, the radio station plug-in 16 requests the playlist for the radio station from a remote radio station service. In another embodiment, the radio station plug-in 16 generates the playlist for the radio station at the mobile user device 10. In either embodiment, the playlist is populated from the songs and optionally audio advertisements identified in the user content profile 24 of the user such that the playlist includes at least a subset of the DRM locked content 12 and optionally one or more songs from the owned music content 18, one or more songs accessible from an associated LAN-based media server if any, and/or one or more audio advertisements from the DRM locked content 12 if any. In addition, the playlist may include supplemental content, such as one or more supplemental songs and/or audio advertisements, to be obtained by the mobile user device 10 from one or more remote sources. The supplemental content may, for example, be streamed to the mobile user device 10 upon request.

Preferably, the playlist for the radio station is customized or personalized for the user of the mobile user device 10 based on all or a subset of the information contained in the profiles 20. More specifically, the location of the mobile user device 10 included in the presence data in the local user profile 22 may be used such that songs and/or advertisements related to the current location of the mobile user device 10 are given higher weight or priority when generating the playlist for the radio station. For example, if the mobile user device 10 is located at the beach, then songs related to the beach, such as beach music, may be given higher weight or priority such that those songs are more likely to be selected for the playlist. The user preferences from the local user profile 22 may similarly be used such that songs corresponding to the user preferences of the user are given higher weight or priority such that those songs are more likely selected for the playlist.

The recently played profile 26 may be used to, for example, ensure that recently played songs are not repeated for at least a predetermined amount of time after they were last played, give higher weight or priority to other songs that are related or similar to the recently played songs, or the like. The vendor maintained profile 28 may be utilized such that, for example, songs previously purchased by the user from the vendor are not included in the playlist for the radio station, advertisements are selected based on a purchase history of the user, or the like.

Once the playlist for the radio station is obtained, in combination with the media player application 14, the radio station plug-in 16 provides playback of the playlist, thereby providing or presenting the radio station to the user of the mobile user device 10 (step 104). During playback of the playlist for the radio station, the radio station plug-in 16 enables playback of the songs and/or advertisements from the DRM locked content 12 included in the playlist for the radio station. Note that any suitable DRM technique may be used. Further, if the playlist for the radio station includes supplemental content, the radio station plug-in 16, or alternatively the media player application 14, obtains supplemental content from the corresponding one or more remote sources during or prior to playback of the playlist for the radio station. The supplemental content may be, for example, requested and streamed to the mobile user device 10 as needed.

In the preferred embodiment, the radio station plug-in 16 also reports playback of the playlist for the radio station to a remote entity such as, for example, the remote radio station service for royalty tracking (step 106). Based on the reported playback, the remote radio station service determines the amount of royalties to be paid to corresponding content providers owning the rights to the songs in the playlist for the radio station and effects payment of the determined royalties. Note that by downloading the DRM locked content 12 for the radio station to the mobile user device 10 in advance and then using at least a subset of the DRM locked content 12 and, optionally, at least a subset of the owned music content 18 for the radio station, bandwidth requirements for the mobile user device 10 are substantially reduced as compared to that which would be needed to deliver the same radio station using traditional streaming IP radio station technology.

Figure 3:
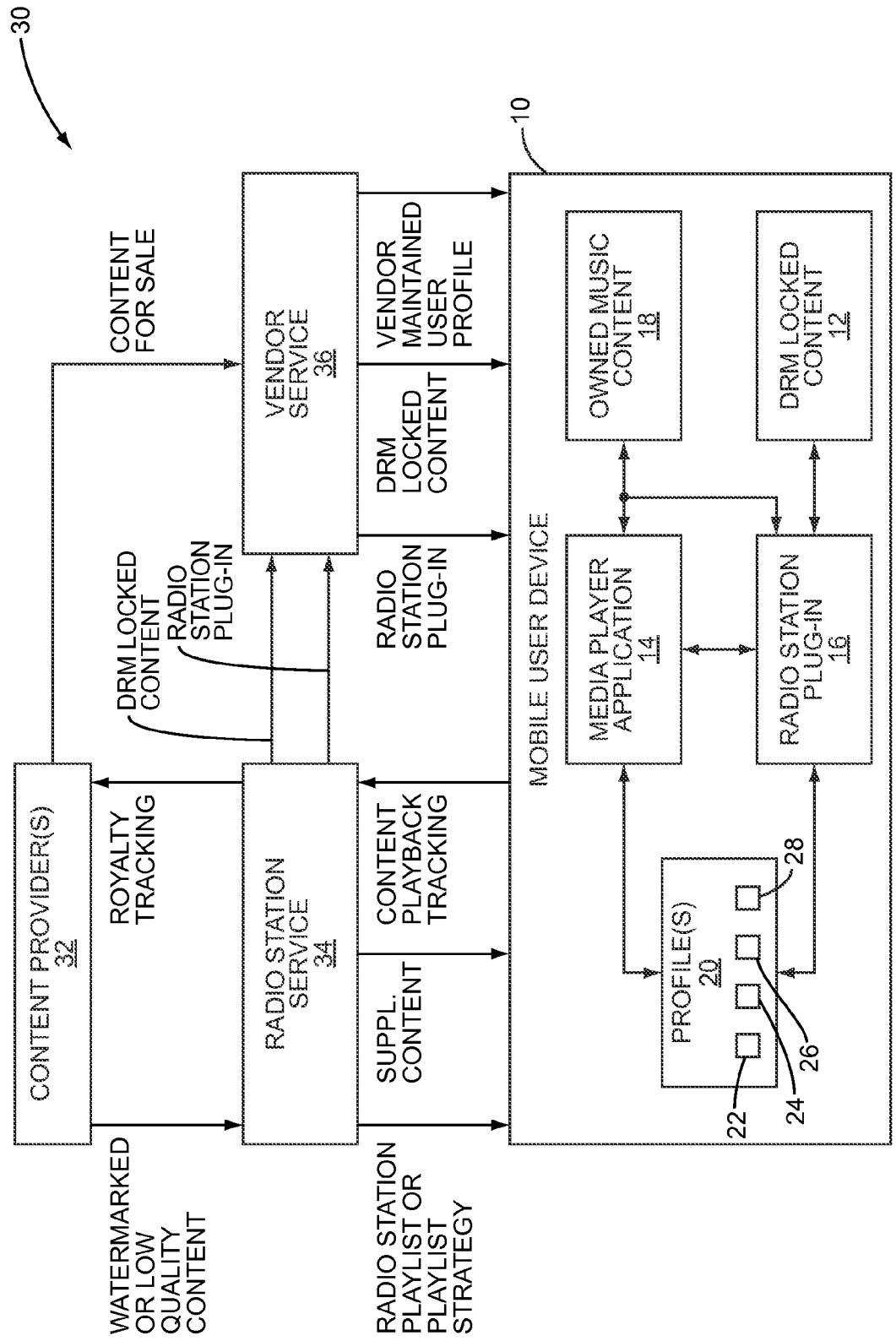
FIG. 3 illustrates a system, including the mobile user device of FIG. 1, enabling the mobile user device to provide a radio station for playback using DRM locked content previously provided to the mobile user device for the radio station according to one embodiment of the present invention.

FIG. 3 illustrates a system 30 for providing a radio station using the DRM locked content 12 stored by the mobile user device 10 according to one embodiment of the present invention. In general, the system 30 includes one or more content providers 32, a radio station service 34, a vendor service 36, and the mobile user device 10. It should be noted that in an alternative embodiment, the functionality of the radio station service 34 and the vendor service 36 may be combined into a single vendor radio service. The content providers 32 generally own the copyrights to songs provided to the radio station service 34 for use in one or more radio stations and provided to the vendor service 36 for sale to users, such as the user of the mobile user device 10. In this embodiment, the one or more content providers 32 provide versions of songs to the radio station service 34 for use in one or more radio stations managed by the radio station service 34, where the versions of the songs are watermarked and/or low-quality. For example, the versions of the songs provided to the radio station service 34 may be watermarked as being for radio use only.

At some point, the vendor associated with the vendor service 36 enters into a business agreement with operators of the radio station service 34 in order to obtain a vendor based radio station, which is also referred to herein as a radio station of the vendor 36. In response, the radio station service 34 provides the radio station plug-in 16 for the radio station of the vendor to the vendor service 36 for distribution. In addition, the radio station service 34 DRM locks all or at least a subset of the watermarked or low quality content received from the one or more content providers 32 to provide the DRM locked content 12 for use only with the radio station plug-in 16 for the radio station of the vendor, and provides the DRM locked content 12 to the vendor service 36 for distribution. Thereafter, the vendor service 36 distributes the radio station plug-in 16 and the DRM locked content 12 for the radio station of the vendor to the mobile user device 10. As discussed below, the radio station plug-in 16 and the DRM locked content 12 are then utilized by the mobile user device 10 to provide the radio station of the vendor to the associated user. Note that while only the mobile user device 10 is discussed herein, the vendor service 36 may distribute the radio station plug-in 16 and the DRM locked content 12 to any number of mobile user devices.

Figure 4:
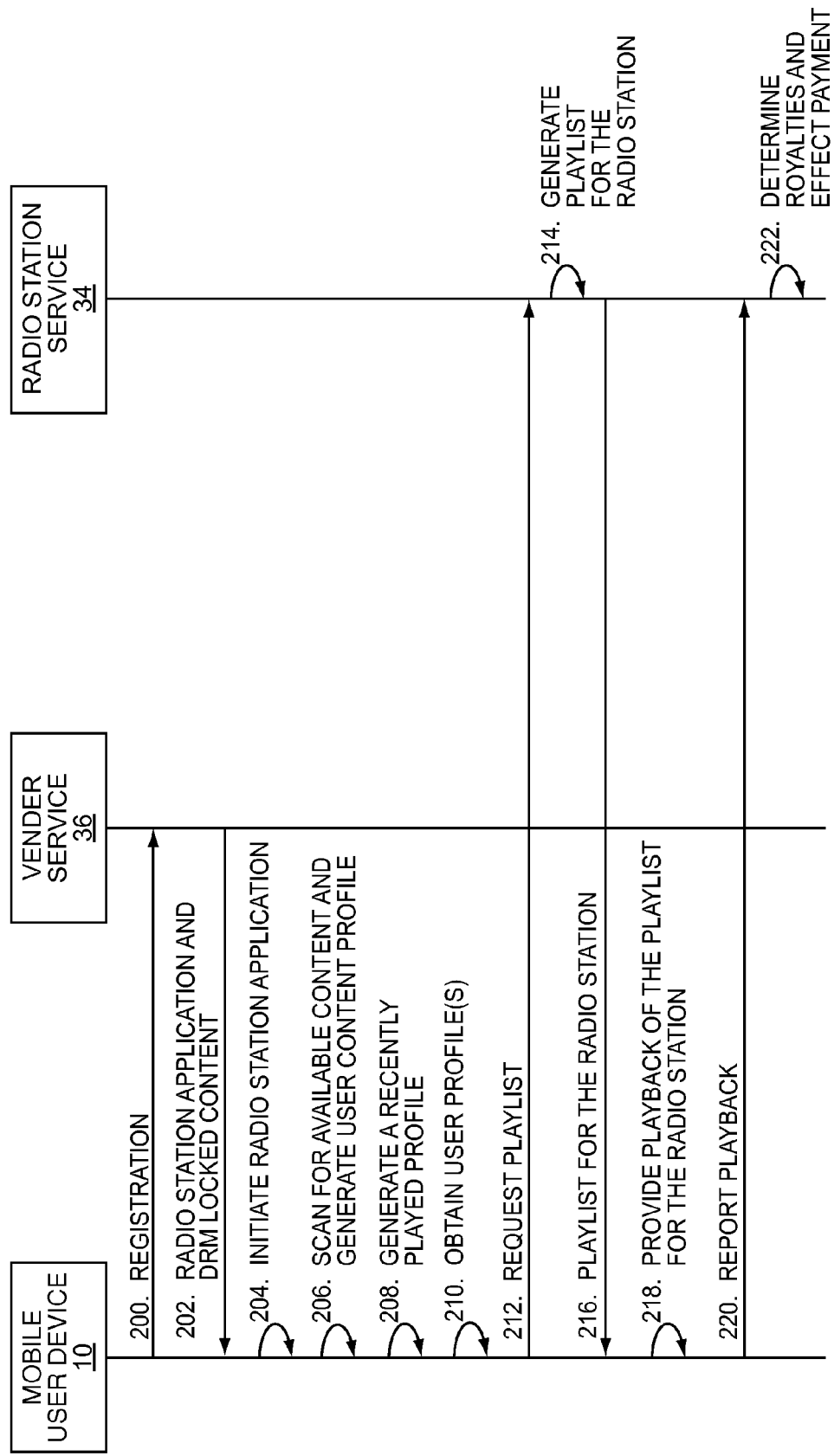
FIG. 4 illustrates the operation of the system of FIG. 3 according to one embodiment of the present invention.

FIG. 4 illustrates the operation of the system 30 with respect to the distribution and utilization of the radio station plug-in 16 and the DRM locked content 12 to provide the radio station of the vendor at the mobile user device 10 according to one embodiment of the present invention. First, the mobile user device 10 registers with the vendor service 36 (step 200). At that time or some time thereafter, the mobile user device 10 downloads the radio station plug-in 16 and the DRM locked content 12 for the radio station of the vendor from the vendor service 36 (step 202). Preferably, the DRM locked content 12 is DRM locked for use only by the radio station plug-in 16. In one embodiment, the vendor service 36 is hosted by a computing system, such as a server, located within a physical brick-and-mortar store of the vendor, and the mobile user device 10 downloads the radio station plug-in 16 and the DRM locked content 12 from the vendor service 36 via a LAN or PAN connection to the computing system within the store. In another embodiment, the vendor service 36 is hosted by a network server, such as an Internet Protocol (IP) server, in association with or as part of an electronic store (e.g., a website) of the vendor, and the mobile user device 10 downloads the radio station plug-in 16 and the DRM locked content 12 from the network server via a WAN or LAN connection. For example, the mobile user device 10 may download the radio station plug-in 16 and the DRM locked content 12 from the vendor service 36 via a wireless WAN or LAN connection to the network server over a global network such as the Internet.

The radio station plug-in 16 is then initiated at the mobile user device 10 (step 204). In one embodiment, the radio station plug-in 16 is initiated by user input from the user of the mobile user device 10. For example, an identifier of the radio station may be presented in a Graphical User Interface (GUI) of the media player application 14, and the user may click on or otherwise select the indicator of the radio station in order to instruct the mobile user device 10 to initiate the radio station plug-in 16. Upon being initiated, the radio station plug-in 16 scans the mobile user device 10 and, optionally, any accessible LAN-based media server to generate the user content profile 24 (step 206). In this embodiment, the user content profile 24 includes information identifying songs in the DRM locked content 12, songs in the owned music content 18, and, optionally, songs accessible to the mobile user device 10 via any accessible LAN-based media servers. In addition, if the DRM locked content 12 includes audio advertisements, the user content profile 24 may also include information identifying the audio advertisements.

The radio station plug-in 16 also generates the recently played profile 26 (step 208). In one embodiment, the radio station plug-in 16 generates the recently played profile 26 based on a play history maintained by the media player application 14. Alternatively, the play history maintained by the media player application 14 may be used as the recently played profile 26. Still further, the radio station plug-in 16 obtains the local user profile 22, the vendor maintained profile 28, or both (step 210). In one embodiment, the local user profile 22 may be generated and maintained by the radio station plug-in 16. In another embodiment, the user preferences may be maintained by the media player application 14 and combined with the presence data of the user to provide the local user profile 22. The vendor maintained profile 28 may be provided to the mobile user device 10 in association with the radio station plug-in 16 and the DRM locked content 12. Alternatively, the radio station plug-in 16 may request the vendor maintained profile 28 from the vendor service 36 when desired. In yet another embodiment, the vendor maintained user profile 28 may be maintained and stored by the vendor service 36. Then, when the remote station service 34 generates the playlist in the manner described below, the remote station service 34 may use a user identifier (ID) of the user of the mobile user device 10 to request the vendor maintained profile 28 from the vendor service 36.

In this embodiment, the radio station plug-in 16 then sends a request to the radio station service 34 for a playlist for the radio station (step 212). The request may include the local user profile 22 of the user of the mobile user device 10 or some subset thereof, the user content profile 24 identifying the content available to the user, and the recently played profile 26 of the user or some subset thereof. In addition, the request may include the vendor maintained profile 28 or some subset thereof. Alternatively, the request may include information, such as a user ID of the user of the mobile user device 10, enabling the radio station service 34 to obtain the vendor maintained profile 28 of the user or some subset thereof from the vendor service 36.

Then, based on at least some of the information contained in the profiles 22 through 28 and one or more predetermined rules for the radio station, the radio station service 34 generates a playlist for the radio station (step 214). The playlist for the radio station is generated such that the playlist includes one or more songs from the DRM locked content 12 already stored by the mobile user device 10. In addition, the playlist for the radio station may include one or more songs from the owned music content 18 already stored by the mobile user device 10. Still further, if the mobile user device 10 has access to songs stored by an associated LAN-based media server, the playlist for the radio station may include one or more songs stored by the associated LAN-based media server. The playlist for the radio station may also include supplemental content such as one or more supplemental songs identified by the radio station service 34. In this example, the supplemental content is hosted by the radio station service 34. However, the present invention is not limited thereto. If audio advertisements are desired, the playlist for the radio station may also include one or more audio advertisements. The audio advertisements may be included in the DRM locked content 12 or be supplemental content hosted by one or more remote sources such as, for example, the radio station service 34 or the vendor service 36.

The rules utilized for generating the playlist for the radio station may include one or more global rules applicable to all radio stations managed by the radio station service 34 and one or more rules specific to the radio station of the vendor. For example, the one or more global rules may include a rule stating that on a particular radio station, within any three hour period, the content of the radio station can contain no more than three songs from any one album or compact disc (CD), and no more than two such songs can be played consecutively. As another example, the one or more global rules may include a rule stating that on a particular radio station, within any three hour period, the content of the radio station can contain no more than four different songs by the same featured artist or from any set or compilation, and no more than three such songs can be played consecutively. The one or more rules specific to the radio station of the vendor may include, for example, a rule stating that an audio advertisement is to be inserted approximately every ten (10) minutes or define a desired non-advertisement to advertisement time ratio (e.g., ten minutes of non-advertisement content for every one minute of advertisement content), one or more rules stating how audio advertisements are to be selected for the playlist for the radio station, or the like.

In one embodiment, in order to generate the playlist for the radio station, the songs identified by the user content profile 24 and, optionally, one or more supplemental songs available from one or more sources, such as the radio station service 34, that are not identified in the user content profile 24 are scored based on the user preferences and presence data included in the local user profile 22 of the user, the recently played profile 26 of the user, the vendor maintained profile 28 of the user, or any combination thereof. The songs for the playlist for the radio station are then selected based on the scores and according to the one or more rules for the radio station. If desired, audio advertisements may also be selected and inserted into the playlist for the radio station according to the one or more advertisement related rules for the radio station. It should be noted that while the discussion herein focuses on customizing or personalizing the radio station for the user of the mobile user device 10 based on the profiles 22 through 28, the present invention is not limited thereto. Any suitable customized radio station content selection technique may be used to select content for the radio station from the content identified in the user content profile 24 so long as the playlist for the radio station includes at least a subset of the DRM locked content 12 already stored by the mobile user device 10.

Once the playlist for the radio station is generated, the playlist is returned to the radio station plug-in 16 at the mobile user device 10 (step 216). In combination with the media player application 14, the radio station plug-in 16 then provides playback of the playlist for the radio station, thereby presenting the radio station of the vendor to the user of the mobile user device 10 (step 218). For songs from the DRM locked content 12, the radio station plug-in 16 unlocks the songs for playback. If the playlist for the radio station contains supplemental content, the supplemental content is obtained from the one or more corresponding remote sources using, for example, references such as Uniform Resource Locators (URLs) contained in the playlist for the radio station. For example, the radio station service 34 may host supplemental songs and audio advertisements included in the playlist for the radio station. As such, the mobile user device 10 may request the supplemental songs and audio advertisements from the radio station service 34 for playback. The supplemental songs and audio advertisements may be streamed to the mobile user device 10 or downloaded to the mobile user device 10 upon request.

Note that if visual advertisements are to be displayed during playback of the radio station, the radio station plug-in 16 obtains the visual advertisements and presents the visual advertisements during playback of the radio station. The visual advertisements may be included in the DRM locked content 12 or may be supplemental content obtained from one or remote sources such as the radio station service 34 or the vendor service 36 as needed. The selection of visual advertisements may be based on all or a portion of the information included in one or more of the profiles 22 through 28. For example, in one embodiment, the visual advertisements are selected based on all or a portion of the information included in the local user profile 22 and the vendor maintained profile 28 of the user of the mobile user device 10.

During playback of the radio station, the user of the mobile user device 10 may be enabled to purchase, if desired, the DRM locked songs included in the radio station. For example, while a DRM locked song selected for the radio station is playing, the radio station plug-in 16 may enable the user to select the DRM locked song for purchase. At that time or at some time thereafter, the radio station plug-in 16 initiates purchase of the DRM locked song from, for example, the vendor service 36. Once the user purchases the DRM locked song, a version of the song provided by the content provider 32 to the vendor service 36 for sale is downloaded to the mobile user device 10 and added to the owned music content 18. In an alternative embodiment, the DRM locked song may be unlocked and added to the owned music content 18 of the user. In this alternative embodiment, the DRM locked song is preferably a high quality version of the song and is preferably not watermarked as being for radio use only.

Similarly, if audio advertisements are included in the playlist for the radio station, the radio station plug-in 16 may enable the user of the mobile user device 10 to purchase the advertised products if desired. For example, if there is an audio advertisement for a product offered by the vendor, the radio station plug-in 16 may enable the user to select the product for purchase by, for instance, pressing a corresponding button during the audio advertisement. In response, the radio station plug-in 16 initiates a purchase process for purchasing the selected product from the vendor via the vendor service 36. Likewise, if visual advertisements are presented to the user during playback of the radio station, the radio station plug-in 16 may enable the user to purchase the advertised products.

Lastly, the radio station plug-in 16 of the mobile user device 10 reports playback of the songs to the radio station service 34 for royalty tracking (step 220). The radio station service 34 then determines the appropriate amount of royalties to be paid to the one or more content providers 32 and effects payment of the royalties (step 222). Alternatively, the radio station service 34 may report playback to the one or more content providers 32 for royalty tracking by the one or more content providers 32.

Figure 5:
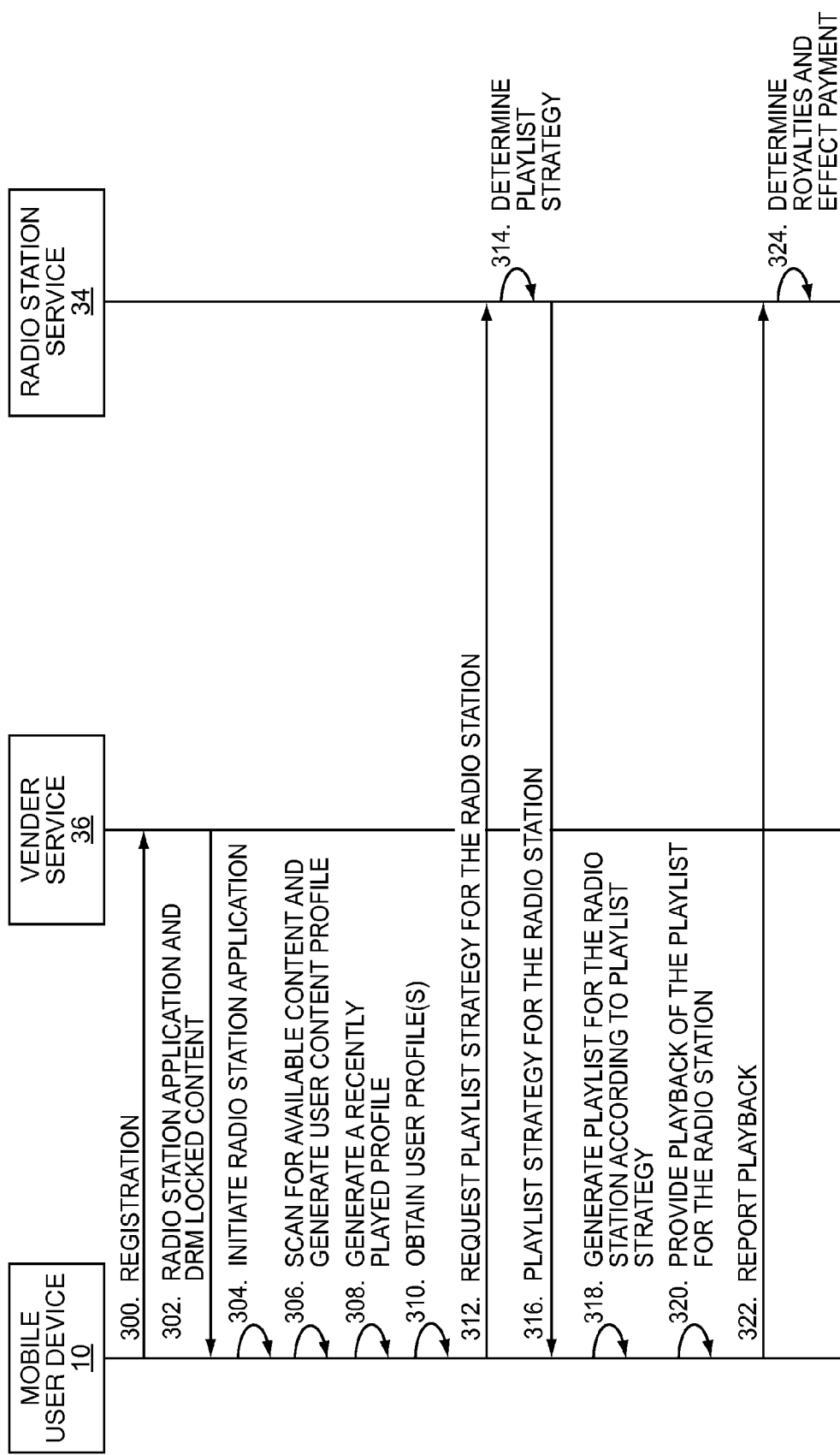
FIG. 5 illustrates the operation of the system of FIG. 3 according to another embodiment of the present invention.

FIG. 5 illustrates the operation of the system 30 with respect to the distribution and utilization of the radio station plug-in 16 and the DRM locked content 12 for the radio station of the vendor according to another embodiment of the present invention. First, the mobile user device 10 registers with the vendor service 36 (step 300). At that time or some time thereafter, the mobile user device 10 downloads the radio station plug-in 16 and the DRM locked content 12 for the radio station of the vendor from the vendor service 36 (step 302). The radio station plug-in 16 is then initiated at the mobile user device 10 (step 304). Upon being initiated, the radio station plug-in 16 scans the mobile user device 10 and, optionally, any accessible LAN-based media access server to generate the user content profile 24 (step 306). In this embodiment, the user content profile 24 includes information identifying songs in the DRM locked content 12, songs in the owned music content 18, and, optionally, songs accessible to the mobile user device 10 via any accessible LAN-based media servers. In addition, if the DRM locked content 12 includes audio advertisements, the user content profile 24 may also include information identifying the audio advertisements.

The radio station plug-in 16 also generates the recently played profile 26 (step 308). In one embodiment, the radio station plug-in 16 generates the recently played profile 26 based on a play history maintained by the media player application 14. Alternatively, the play history maintained by the media player application 14 may be used as the recently played profile 26. Still further, the radio station plug-in 16 obtains the local user profile 22, the vendor maintained profile 28, or both (step 310). In one embodiment, the local user profile 22 may be generated and maintained by the radio station plug-in 16. In another embodiment, the user preferences may be maintained by the media player application 14 and combined with the presence data of the user to provide the local user profile 22. The vendor maintained profile 28 may be provided to the mobile user device 10 in association with the radio station plug-in 16 and the DRM locked content 12. Alternatively, the radio station plug-in 16 may request the vendor maintained profile 28 from the vendor service 36 when desired. In yet another embodiment, the vendor maintained profile 28 may be maintained and stored by the vendor service 36. Then, when the remote station service 34 generates the playlist for the radio station in the manner described below, the remote station service 34 may use a user ID of the user of the mobile user device 10 to request the vendor maintained profile 28 from the vendor service 36.

In this embodiment, the radio station plug-in 16 then sends a request to the radio station service 34 for a playlist strategy for the radio station (step 312). In one embodiment, the playlist strategy is customized or personalized for the user of the mobile user device 10. As such, in order to enable customization, the request may include the local user profile 22 of the user of the mobile user device 10 or some subset thereof, the user content profile 24 identifying the content available to the user, and the recently played profile 26 of the user or some subset thereof. In addition, the request may include the vendor maintained profile 28 or some subset thereof. Alternatively, the request may include information, such as a user ID of the user of the mobile user device 10, enabling the radio station service 34 to obtain the vendor maintained profile 28 of the user or some subset thereof from the vendor service 36.

Then, based on at least some of the information contained in the profiles 22 through 28, the radio station service 34 generates or otherwise determines the playlist strategy for the radio station (step 314). The playlist strategy generally includes one or more rules which will enable the radio station plug-in 16 to generate a playlist for the radio station at the mobile user device 10. In one embodiment, the one or more rules include one or more global rules applicable to all radio stations and one or more specific rules for the radio station. The one or more specific rules may include one or more user specific rules, one or more vendor specific rules, or both.

The one or more global rules may include, for example, a rule stating that on a particular radio station, within any three hour period, the content of the radio station can contain no more than three songs from any one album or CD, and no more than two such songs can be played consecutively. As another example, the one or more global rules may include a rule stating that on a particular radio station, within any three hour period, the content of the radio station can contain no more than four different songs by the same featured artist or from any set or compilation, and no more than three such songs can be played consecutively. The one or more vendor specific rules may include, for example, a rule stating that an audio advertisement is to be inserted approximately every ten (10) minutes or define a desired non-advertisement to advertisement time ratio (e.g., ten minutes of non-advertisement content for every one minute of advertisement content), one or more rules stating how audio advertisements are to be selected for the playlist for the radio station, or the like.

The one or more user specific rules are generally rules determined based on the information from the local user profile 22 of the user, the user content profile 24, the recently played profile 26, the vendor maintained profile 28, or any combination thereof. For example, the one or more user specific rules may give higher weight or priority to songs related to the preferences or presence data included in the local user profile 22. As another example, if the number of songs identified in the user content profile 24 is less than a threshold number, the one or more user specific rules may state that supplemental songs are to be used for the playlist for the radio station and define, for example, a supplemental song to non-supplemental song ratio (e.g., one supplemental song for every five non-supplemental songs). Further, based on the user content profile 24, one or more user specific rules may be provided that tailor song selection for the playlist for the radio station based on the songs that are available to the user. As a final example, the vendor maintained profile 28 may be the basis of one or more user specific rules such as a rule stating that the playlist for the radio station is not to include songs that the user previously purchased from the vendor, a rule stating that the playlist for the radio station is to include songs similar to or related to songs that the user previously purchased from the vendor, or the like.

The radio station service 34 then returns the playlist strategy for the radio station to the radio station plug-in 16 of the mobile user device 10 (step 316). The radio station plug-in 16 of the mobile user device 10 then generates a playlist for the radio station according to the playlist strategy (step 318). The playlist for the radio station is generated such that the playlist for the radio station includes one or more songs from the DRM locked content 12 already stored by the mobile user device 10. In addition, the playlist for the radio station may include one or more songs from the owned music content 18 already stored by the mobile user device 10. Still further, if the mobile user device 10 has access to songs stored by an associated LAN-based media server, the playlist for the radio station may include one or more songs stored by the associated LAN-based media server. The playlist for the radio station may also include supplemental content such as one or more supplemental songs identified by the radio station service 34. This supplemental content is hosted by one or more sources. In this example, the supplemental content is hosted by the radio station service 34. If audio advertisements are desired, the playlist for the radio station may also include one or more audio advertisements. The audio advertisements may be included in the DRM locked content 12 or hosted by one or more remote sources such as, for example, the radio station service 34 or the vendor service 36.

In an alternative embodiment, the playlist strategy is a general strategy for the radio station that is not customized for the user. For example, the playlist strategy may include one or more global rules and one or more vendor specific rules. In one embodiment, in order to generate the playlist for the radio station, the songs identified by the user content profile 24 and, optionally, one or more supplemental songs available from one or more sources, such as the radio station service 34, that are not identified in the user content profile 24 are scored based on the user preferences and presence data included in the local user profile 22 of the user, the recently played profile 26 of the user, the vendor maintained profile 28 of the user, or any combination thereof. The songs for the playlist for the radio station and, optionally, audio advertisements are then selected based on the scores and the playlist strategy.

Once the playlist for the radio station is generated, in combination with the media player application 14, the radio station plug-in 16 provides playback of the playlist for the radio station, thereby presenting the radio station of the vendor to the user of the mobile user device 10 (step 320). For songs from the DRM locked content 12, the radio station plug-in 16 unlocks the songs for playback. If the playlist for the radio station contains supplemental content, the supplemental content is obtained from one or more remote sources using, for example, references such as URLs contained in the playlist for the radio station. For example, the radio station service 34 may host supplemental songs and audio advertisements included in the playlist for the radio station. As such, the mobile user device 10 may request the supplemental songs and audio advertisements from the radio station service 34 for playback. The supplemental songs and audio advertisements may be streamed to the mobile user device 10 or downloaded to the mobile user device 10 upon request.

Note that if visual advertisements are to be displayed during playback of the radio station, the radio station plug-in 16 obtains the visual advertisements and presents the visual advertisements during playback of the radio station. The visual advertisements may be included in the DRM locked content 12 or obtained from one or remote sources such as the radio station service 34 or the vendor service 36 as needed. The selection of visual advertisements may be based on all or a portion of the information included in one or more of the profiles 22 through 28. In one embodiment, the visual advertisements are selected based on all or a portion of the information included in the local user profile 22 and the vendor maintained profile 28 of the user of the mobile user device 10.

As discussed above, during playback of the radio station, the user of the mobile user device 10 may be enabled to purchase, if desired, the DRM locked songs included in the radio station. Similarly, if audio advertisements are included in the playlist for the radio station, the radio station plug-in 16 may enable the user of the mobile user device 10 to purchase the advertised products if desired. Likewise, if visual advertisements are presented to the user during playback of the radio station, the radio station plug-in 16 may enable the user to purchase the advertised products.

Lastly, the radio station plug-in 16 of the mobile user device 10 reports playback of the songs to the radio station service 34 for royalty tracking (step 322). The radio station service 34 then determines the appropriate amount of royalties to be paid to the one or more content providers 32 and effects payment of the royalties (step 324). Alternatively, the radio station service 34 may report playback to the one or more content providers 32 for royalty tracking by the one or more content providers 32.

Figure 6:
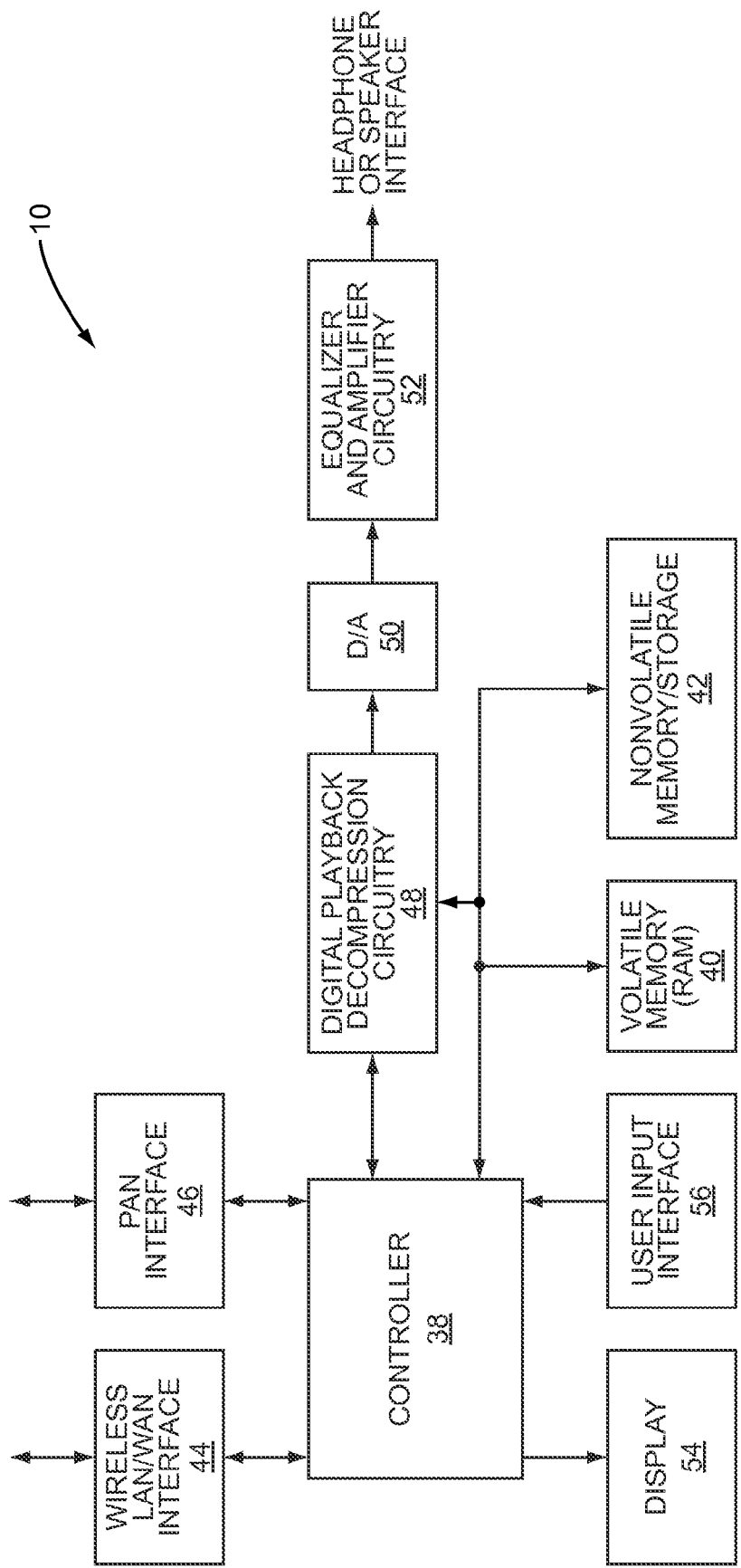
FIG. 6 is a block diagram of one exemplary implementation of the mobile user device of FIG. 1.

FIG. 6 is a block diagram of one implementation of the mobile user device 10 of FIG. 1 according to one embodiment of the present invention. In general, the mobile user device 10 includes a controller 38 having associated volatile memory 40 such as Random Access Memory (RAM). In one embodiment, the media player application 14 and the radio station plug-in 16 are implemented in software and stored in the volatile memory 40 for execution by the controller 38. The mobile user device 10 also includes nonvolatile memory or storage 42 such as, for example, Read Only Memory (ROM), flash memory, one or more hard disk drives, or the like. In one embodiment, the owned music content 18 and the DRM locked content 12 may be stored in the nonvolatile memory or storage 42. Alternatively, the owned music content 18 and/or the DRM locked content 12 may completely or partially be stored in the volatile memory 40, at least during operation of the media player application 14 and/or the radio station plug-in 16. Note that the media player application 14 and the radio station plug-in 16 may also be stored in the nonvolatile memory or storage 42 when not in operation.

The mobile user device 10 also includes a wireless LAN/WAN interface 44 and/or a PAN interface 46. The wireless LAN/WAN interface 44 may be, for example, a WiMAX (IEEE 802.16x) wireless interface, a LTE or similar 3G or 4G mobile communications interface, a WiFi (802.11x) wireless interface, or the like. The PAN interface 46 may be, for example, a Firewire interface, a USB interface, a Bluetooth interface, a UWB interface, or the like. As discussed above, the wireless LAN/WAN interface 44 or the PAN interface 46 may be used to obtain the radio station plug-in 16 and the DRM locked content 12. The wireless LAN/WAN interface 44 is also used to communicate with the radio station service 34 (FIG. 3) for purposes of obtaining a playlist or playlist strategy for the radio station from the radio station service 34 and, optionally, obtain supplemental content from one or more remote sources such as, for example, the radio station service 34 or the vendor service 36 (FIG. 3). The mobile user device 10 also includes digital playback decompression circuitry 48, a digital-to-analog (D/A) converter 50, and equalizer and amplifier circuitry 52 for use in playback of audio content to the user via a headphone or speaker interface. The mobile user device 10 also includes a display 54 and a user input interface 56.

The mobile user device 10 and the system 30 offer substantial opportunity for variation without departing from the spirit or scope of the present invention. For example, while the discussion herein focuses on a mobile user device 10, the present invention is not limited thereto. The present invention may also be used for substantially non-mobile user devices such as personal computers or the like. As another example, while the discussion herein focuses on providing a radio station including a playlist of songs and, optionally, advertisements, the present invention is not limited thereto. The present invention may also be used to provide a video station or channel similar to a broadcast television channel. Like the radio station discussed above, the video station may be provided by downloading DRM locked video content such as DRM locked television shows, DRM locked movies, DRM locked video clips, DRM locked video advertisements, or the like. A playlist for the video station may then be obtained in much that same manner as the playlist for the radio station. Like the playlist for the radio station discussed above, the playlist for the video station may be customized or personalized for the user of the non-mobile user device.

Those skilled in the art will recognize improvements and modifications to the preferred embodiments of the present invention. All such improvements and modifications are considered within the scope of the concepts disclosed herein and the claims that follow.

What is claimed is:

1. A method of operating a user device, comprising:
   downloading Digital Rights Management (DRM) locked content for a radio station, the DRM locked content comprising a plurality of DRM locked songs to be used only by a radio station plug-in to provide the radio station;
   after downloading the DRM locked content for the radio station, obtaining a playlist for the radio station, the playlist for the radio station comprising a plurality of songs including at least a subset of the plurality of DRM locked songs;
   providing playback of the playlist for the radio station such that content of the radio station is presented to a user of the user device; and
   reporting playback of the plurality of songs for royalty tracking,
   wherein at least one of the preceding actions is performed on at least one electronic hardware component.

2. The method of claim 1 wherein downloading the DRM locked content comprises downloading the DRM locked content prior to providing playback of the playlist for the radio station.

3. The method of claim 1 wherein obtaining the playlist for the radio station comprises:
   sending a request for the playlist for the radio station to a remote service; and
   receiving the playlist for the radio station from the remote service in response to the request.

4. The method of claim 3 wherein the playlist for the radio station is generated by the remote service according to one or more rules for the radio station and such that the playlist for the radio station comprises the plurality of songs including the at least a subset of the plurality of DRM locked songs.

5. The method of claim 4 wherein the playlist for the radio station is further generated by the remote service such that the playlist for the radio station is customized for the user of the user device.

6. The method of claim 1 wherein obtaining the playlist for the radio station comprises generating the playlist for the radio station at the user device.

7. The method of claim 6 wherein generating the playlist for the radio station at the user device comprises:
   sending a request for a playlist strategy for the radio station to a remote service;

receiving the playlist strategy for the radio station from the remote service; and generating the playlist for the radio station based on the playlist strategy for the radio station and such that the playlist for the radio station comprises the plurality of songs including the at least a subset of the plurality of DRM locked songs.

8. The method of claim 7 wherein the playlist strategy for the radio station is generated by the remote service according to one or more rules for the radio station.

9. The method of claim 8 wherein the playlist strategy for the radio station is further generated by the remote service such that the playlist strategy for the radio station is customized for the user of the user device.

10. The method of claim 1 wherein the playlist for the radio station is customized for the user of the user device such that the radio station is a customized radio station for the user of the user device.

11. The method of claim 10 wherein the playlist for the radio station is customized based on at least one of a group consisting of: a location of the user of the user device, an activity being performed by the user of the user device, one or more user preferences of the user of the user device, information identifying songs available at the user device for the radio station including the plurality of DRM locked songs, a recently played profile of the user of the user device, and a profile identifying a purchase history of the user of the user device.

12. The method of claim 1 wherein the plurality of songs in the playlist for the radio station further comprises one or more songs owned by the user of the user device and stored by the user device.

13. The method of claim 1 wherein the plurality of songs in the playlist for the radio station further comprises one or more songs available to the user device from a Local Area Network (LAN) based server to which the user device is enabled to connect.

14. The method of claim 13 wherein the one or more songs available to the user device from the LAN based server are owned by the user of the user device.

15. The method of claim 1 wherein the DRM locked content further comprises a plurality of DRM locked audio advertisements, and the playlist for the radio station further comprises one or more of the plurality of DRM locked audio advertisements.

16. The method of claim 1 wherein the playlist for the radio station further comprises supplemental content hosted by one or more remote sources.

17. The method of claim 16 wherein the supplemental content comprises one or more supplemental songs.

18. The method of claim 17 wherein the one or more supplemental songs are not owned by the user of the user device and are not included in the DRM locked content downloaded to the user device.

19. The method of claim 16 wherein the supplemental content comprises one or more audio advertisements.

20. The method of claim 16 wherein providing playback of the playlist for the radio station comprises obtaining the supplemental content from the one or more remote sources.

21. The method of claim 1 wherein the radio station is a vendor based radio station of a vendor.

22. The method of claim 21 wherein downloading the DRM locked content comprises downloading the DRM locked content from a vendor service associated with the vendor via a Wide Area Network (WAN) connection.

23. The method of claim 22 wherein the WAN connection is a wireless WAN connection.

24. The method of claim 21 wherein downloading the DRM locked content comprises downloading the DRM locked content from a vendor service associated with the vendor via an Internet connection.

25. The method of claim 21 wherein downloading the DRM locked content comprises downloading the DRM locked content from a vendor service associated with the vendor via a Local Area Network (LAN) connection.

26. The method of claim 25 wherein the LAN connection is a wireless LAN connection.

27. The method of claim 25 wherein the vendor service is hosted by a computing system located within a physical store of the vendor, and the LAN connection is a LAN connection to the computing system located within the physical store of the vendor.

28. The method of claim 21 wherein downloading the DRM locked content comprises downloading the DRM locked content from a vendor service associated with the vendor via a Personal Area Network (PAN) connection.

29. The method of claim 28 wherein the vendor service is hosted by a computing system located within a physical store of the vendor, and the PAN connection is a PAN connection to the computing system located within the physical store of the vendor.

30. The method of claim 21 further comprising enabling the user of the user device to purchase at least one of the subset of the plurality of DRM locked songs in the playlist for the radio station from the vendor.

31. The method of claim 21 wherein the playlist for the radio station further comprises one or more audio advertisements of the vendor.

32. The method of claim 31 further comprising enabling the user to purchase one or more products advertised by the one or more audio advertisements from the vendor.

33. The method of claim 1 wherein the user device is a mobile user device.

34. The method of claim 1 wherein reporting playback of the plurality of songs for royalty tracking comprises reporting playback of the plurality of the songs from the playback of the playlist for the radio station.

35. A non-transitory computer readable medium comprising software for instructing a controller of a user device to:
obtain a playlist for a radio station comprising a plurality of songs including at least a subset of a plurality of Digital Rights Management (DRM) locked songs to be used only by a radio station plug-in to provide the radio station, the at least a subset of a plurality of Digital Rights Management (DRM) locked songs included in DRM locked content previously downloaded to the user device for the radio station;
provide playback of the playlist for the radio station such that content of the radio station is presented to a user of the user device; and
report playback of the plurality of songs for royalty tracking.

36. The non-transitory computer readable medium of claim 35 wherein the software further instructs the controller of the user device to report playback of the plurality of songs for royalty tracking wherein the playback of the plurality of songs is from the playback of the playlist for the radio station.

37. A user device, comprising:
at least one communication interface; and
a controller associated with the at least one communication interface and adapted to:
download Digital Rights Management (DRM) locked content for a radio station via the at least one communication interface, the DRM locked content comprising a plurality of DRM locked songs to be used only by a radio station plug-in to provide the radio station;

after downloading the DRM locked content for the radio station via the at least one communication interface, obtain a playlist for the radio station, the playlist for the radio station comprising a plurality of songs including at least a subset of the plurality of DRM locked songs;

provide playback of the playlist for the radio station such that content of the radio station is presented to a user of the user device; and report playback of the plurality of songs for royalty tracking.

38. The user device of claim 37 wherein the controller is further adapted to report playback of the plurality of songs for royalty tracking wherein the playback of the plurality of songs is from the playback of the playlist for the radio station.

* * * * *